United States Patent [19]

Junge et al.

[11] 4,052,371
[45] Oct. 4, 1977

[54] AZO PIGMENT OR DYE HAVING A NAPHTHYL-QUINAZALONE COUPLING COMPONENT

[75] Inventors: Helmut Junge, Wachenheim; Walter Kurtz, Ludwigshafen, both of Germany

[73] Assignee: BASF Aktiengesellschaft, Ludwigshafen, Germany

[21] Appl. No.: 697,772

[22] Filed: June 21, 1976

[30] Foreign Application Priority Data

July 16, 1975 Germany .................. 2531714

[51] Int. Cl.² .................. C09B 29/20; C09B 29/22; D06P 1/04; D06P 3/34
[52] U.S. Cl. .................. 260/154; 106/23; 106/288 Q; 260/202; 260/203; 260/204; 260/251 QA; 260/307 R; 260/325 R; 260/325 PH; 260/558 A
[58] Field of Search .................. 260/154

[56] References Cited

U.S. PATENT DOCUMENTS 3,923,774   12/1975   Dimroth .................. 260/154

OTHER PUBLICATIONS

Arcoria, Index Chemicus, vol. 33, No. 110285, (1969).

*Primary Examiner*—Floyd D. Higel
*Attorney, Agent, or Firm*—Keil, Thompson & Shurtleff

[57] ABSTRACT

Dyes of the formula:

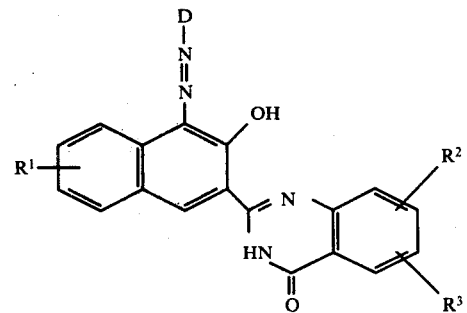

in which
D is the radical of a diazo component;
$R^1$ is hydrogen, chloro, bromo, methoxy or ethoxy;
$R^2$ and $R^3$ independently of one another are hydrogen, chloro, bromo, methyl, ethyl, trifluoromethyl, nitro, methylsulfonyl, ethylsulfonyl, phenylsulfonyl, unsubstituted or N-substituted carbamoyl or sulfamoyl, carboxylic ester, unsubstituted or substituted C-acylamino or phthalimidyl; or
$R^2$ and $R^3$ together form a radical of the formula:

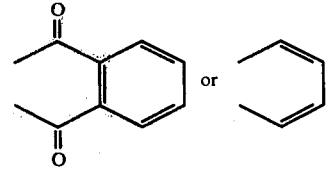

The dyes are eminently suitable for coloring printing inks, surface coatings and resins with excellent fastness properties.

4 Claims, No Drawings

AZO PIGMENT OR DYE HAVING A NAPHTHYL-QUINAZALONE COUPLING COMPONENT

The invention relates to azo dyes of the formula (I):

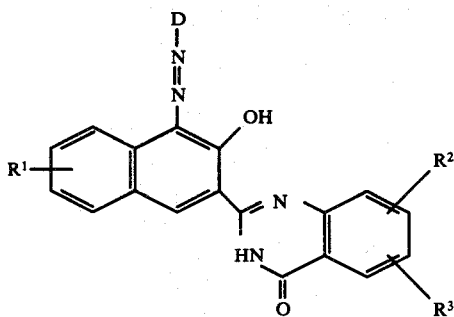

in which

D is the radical of a diazo component;

R¹ is hydrogen, chloro, bromo, methoxy or ethoxy;

R² and R³ independently of one another are hydrogen, chloro, bromo, methyl, ethyl, trifluoromethyl, nitro, methylsulfonyl, ethylsulfonyl, phenylsulfonyl, unsubstituted or N-substituted carbamoyl or sulfamoyl, carboxylic ester, unsubstituted or substituted C-acylamino or phthalimidyl; or R² and R³ together form a radical of the formula:

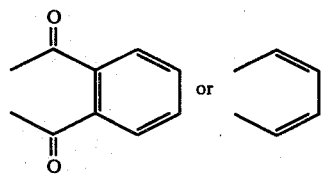

Examples of N-substituted carbamoyl are N-methylcarbamoyl, N-phenylcarbamoy, N-chlorophenylcarbamoyl, N-bromophenylcarbamoyl, N-methylphenylcarbamoyl, N-methoxyphenylcarbamoyl, N-ethoxyphenylcarbamoyl and N-carbomethoxyphenylcarbamoyl. The corresponding sulfamoyl radicals are also suitable.

Examples of C-acylamino are benzoylamino, naphthoylamino, chlorobenzoylamino, bromobenzoylamino, methylbenzoylamino, methoxybenzoylamino, ethoxybenzoylamino or carbomethoxybenzoylamino. The phthalimidyl radical may bear for example chloro or bromo as a substituent.

Carboxylic ester groups include for example carbalkoxy of one to four carbon atoms in the alkoxy, carbophenoxy, carbochlorophenoxy and carbobromophenoxy.

It is preferred to use compounds of the aminoanthraquinone, aminophthalimido or aniline series as diazo components.

Suitable diazo components include diazotizable aromatic amines such as 1-aminoanthraquinone, 2-amino-3-bromoanthraquinone, 3-aminophthalimide, 2-chloroaniline, 3-chloroaniline, 4-chloroaniline, 2,5-dichloroaniline, 2,4-dichloroaniline, 3,4-dichloroaniline, 2,6-dichloroaniline, 2,3-dichloroaniline, 2,4,5-trichloroaniline, 2,4,6-trichloroaniline, 2-bromoaniline, 3-bromoaniline, 4-bromoaniline, 2,4-dibromoaniline, 2,5-dibromoaniline, 2-methyl-5-chloroaniline, 2-methyl-4-chloroaniline, 2-methyl-3-chloroaniline, 2-chloro-5-trifluoromethylaniline, 2-nitroaniline, 3-nitroaniline, 4-nitroaniline, 4-chloro-2-nitroaniline, 2-chloro-4-nitroaniline, 4-methyl-3-nitroaniline, 2-methyl-5-nitroaniline, 2-methyl-4-nitroaniline, 2-methoxyaniline, 4-methoxyaniline, 3-chloro-4-methoxyaniline, 2-methoxy-5-chloroaniline, 2-amino-4-chlorodiphenyl ether, the methyl or ethyl ester of 1-aminobenzene-2-carboxylic acid, the dimethyl ester of 2-aminoterephthalic acid, the diethyl ester of 2-aminoterephthalic acid, the methyl ester of 1-amino-2-chlorobenzene-5-carboxylic acid, the methyl ester of 1-amino-4-chlorobenzene-2-carboxylic acid, 2-amino-5-chlorobenzonitrile, 4-chloro-2-methylsulfonylaniline, 2-methylsulfonylaniline, 4-chloro-2-aminosulfonylaniline, the dimethyl ester of 3-aminoisophthalic acid, 3-amino-4-chlorobenzonitrile, the 4'-isopropoxycarbonylphenyl ester of 4-methoxy-3-aminobenzoic acid, 2-(5-phenyloxadiazolyl-1,3,4)-4-nitroaniline, 2-(3-phenyloxadiazolyl-1,2,4)-aniline, and 2,5-bis-(5-phenyl-1,3,4-oxadiazolyl)-aniline.

The invention relates particularly to compounds of the formula (Ia):

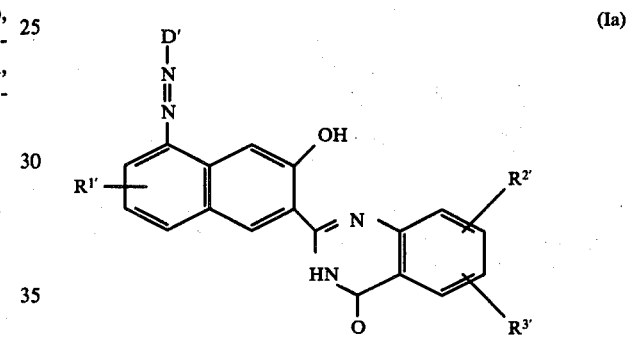

in which

D' is phenyl bearing fluoro, chloro, bromo, trifluoromethyl, nitro, cyano, alkylsulfonyl of one to four carbon atoms, phenylsulfonyl, methoxy, ethoxy, methyl, ethyl, alkoxycarbonyl of one to four carbon atoms, carbamoyl, N-methylcarbamoyl, N-phenylcarbamoyl, sulfamoyl or phenylazo as a substituent, 3-phthalimidyl, 4-phthalimidyl, 3-phthalimidyl or 4-phthalimidyl bearing phenyl, chlorophenyl, methylphenyl or methoxyphenyl as a substituent on the nitrogen atom, 1-anthraquinonyl, 2-anthraquinonyl, 2-chloroanthraquinonyl-1, 3-chloroanthraquinonyl-2 or 3-bromoanthraquinonyl-2;

R¹' is hydrogen, chloro, bromo, methoxy or ethoxy;

R²' is hydrogen, chloro, bromo, methyl, ethyl, trifluoromethyl, nitro, methylsulfonyl, ethylsulfonyl, phenylsulfonyl, carbamoyl, N-phenylcarbamoyl, sulfamoyl, N-phenylsulfamoyl, alkoxycarbonyl of one to four carbon atoms, benzoylamino or phthalimidyl;

R³' is hydrogen, chloro, bromo or nitro; and

R²' and R³' together form

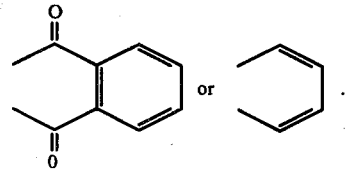

The new dyes may be prepared:

a. by coupling a diazo compound of an amine of the formula (II):

D—NH₂                            (II)

with a coupling component of the formula (III)

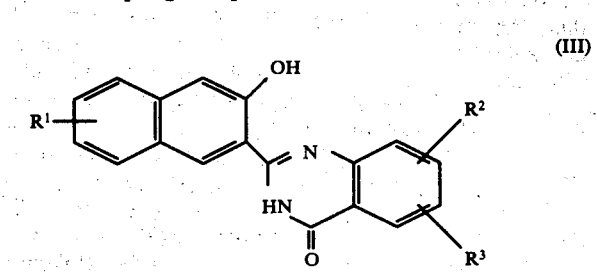

or
b. by condensing an acyl halide of the formula (IV):

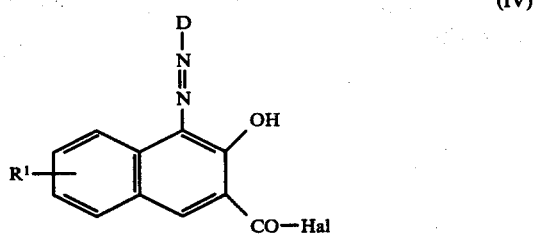

in which Hal is chloro or bromo, with an anthranilamide of the formula (V):

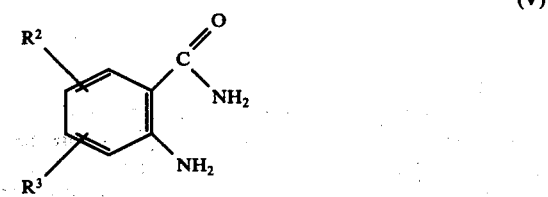

by a known method.

It is also possible in principle to prepare the dyes of formula I by condensing a carboxamide of the formula (VI):

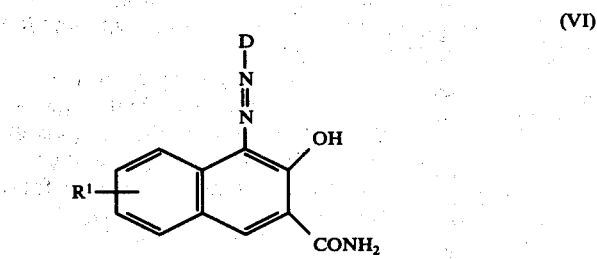

with an isatoic anhydride of the formula (VII):

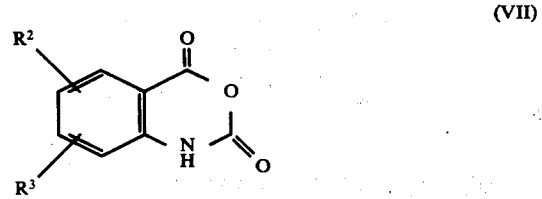

Preparation according to (a) is preferred.

Coupling components of the formula (III) are described in the literature. They are most conveniently accessible by the reaction of an unsubstituted or substituted anthranilamide with β-hydroxynaphthoyl chloride followed by alkaline cyclization, or by the reaction of β-hydroxynaphthoamide with an unsubstituted or substituted isatoic anhydride, for example by the method disclosed in DOS No. 2,027,791.

Pigments of the formula (I) are not always obtained in the optimum physical form for the special purpose for which they are to be used. They may however be converted by known methods such as grinding with salt or heating in water or solvents into the most suitable form.

Pigments of the formula (I) have great tinctorial strength, good hiding power or transparency and some of them are very brilliant. Some of them have very good fastness to light, migration, overspraying and plasticizers. They are suitable for coloring surface coatings and plastics and particularly printing inks. Individual compounds are suitable also for the purpose of dyeing cellulosic textile material described in German Pat. Spec. No. 1,811,796, for example the dye of Example 96.

Compounds of formula (I) in which $R^1 = R^2 = R^3 =$ H are of particular industrial importance.

Preferred diazo components are for example haloanilines, esters or amides of aminobenzenecarboxylic acids and trifluoromethylanilines.

Examples of preferred diazo components are: 2-chloroaniline, 3-chloroaniline, 4-chloroaniline, 2,5-dichloroaniline, 2,4-dichloroaniline, 3,4-dichloroaniline, 2,6-dichloroaniline, 2,4,5-trichloroaniline, 2,4,6-trichloroaniline, 2-methyl-5-chloroaniline, 2-methyl-4-chloroaniline, 2-methoxy-4-chloroaniline, 2-methoxy-5-methylsulfonylaniline, 2-chloro-3-methoxyaniline, 2-methyl-3-chloroaniline, 2-chloro-5-trifluoromethylaniline, 4-chloro-2-trifluoromethylaniline, 3-trifluoromethylaniline, methyl anthranilate, ethyl anthranilate, isobutyl anthranilate, dimethyl 2-aminoterephthalate, diethyl 2-aminoterephthalate, dimethyl 3-aminoisophthalate, the methyl ester of 1-amino-4-chlorobenzene-2-carboxylic acid and also the compounds in which some or all of the chlorine is replaced by bromine.

In the following Examples, which illustrate the invention, the parts are parts by weight and the percentages are percentages by weight; the temperature are given in degrees centigrade.

EXAMPLE 1

9.9 parts of 2,4,5-trichloroaniline is dissolved in 100 parts of concentrated sulfuric acid, cooled to 0° to 5° C and diazotized by adding 18 parts nitrosylsulfuric acid (about 45%). The mixture is stirred at 0° to 5° for 3 hours, then poured onto a mixture of 300 parts of ice and 300 parts of water, about 0.5 part of sulfamic acid is added and the diazonium salt solution is filtered into a solution of 14 parts of 2-(2'-hydroxy-3'-naphthyl)-4(3H)-quinazolone in 30 parts of 50% caustic soda solution, 120 parts of water and 100 parts of N-methylpyrrolidone. A pH of at least 6 is maintained by adding 1N caustic soda solution. The whole is stirred for 4 hours at ambient temperature, then heated for half an hour at 70°, suction filtered and washed thoroughly with water. The moist filter cake is introduced into 150 parts of isobutanol, and the suspension is heated under reflux for two hours, suction filtered at 80° and washed with methanol. 20.2 parts of a brilliant red pigment powder is obtained of the formula:
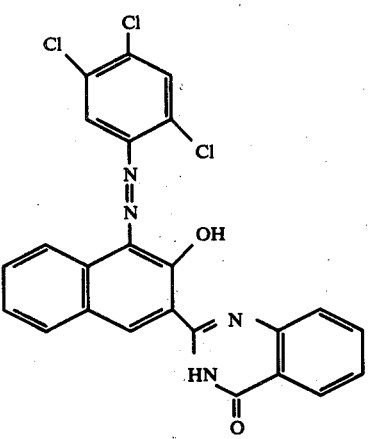
Dyes having the hue indicated in the following Table are obtained analogously to Example 1 with the diazo components and coupling components indicated.

| Ex. No. | Diazo component | Coupling component | Hue |
|---|---|---|---|
| 2 | 2-chloroaniline | 3-hydroxy-2-naphthoyl-(2'-benzoyl)aminohydrazone derivative (structure shown) | red |
| 3 | 3-chloroaniline | " | " |
| 4 | 4-chloroaniline | " | " |
| 5 | 2,4-dichloroaniline | " | " |
| 6 | 2,5-dichloroaniline | " | " |
| 7 | 2,6-dichloroaniline | " | " |

-continued

| Ex. No. | Diazo component | Coupling component | Hue |
|---|---|---|---|
| 8 | 2-bromoaniline | " | " |
| 9 | 2,4-dibromoaniline | " | " |
| 10 | 2,5-dibromoaniline | " | " |
| 11 | 2,3-dichloroaniline | " | " |
| 12 | 2,4,6-trichloroaniline | " | " |
| 13 | 2-methylaniline | " | " |
| 14 | 2-methyl-5-chloroaniline | " | " |

-continued

| Ex. No. | Diazo component | Coupling component | Hue |
|---|---|---|---|
| 15 | 4-chloro-2-methylaniline | " | " |
| 16 | 3-chloro-2-methylaniline | " | " |
| 17 | 2-chloro-4-methylaniline | " | " |
| 18 | 2-chloro-5-methylaniline | " | " |
| 19 | 2-chloro-5-trifluoromethylaniline | " | " |
| 20 | 3-trifluoromethylaniline | " | " |
| 21 | 2-nitroaniline | " | chestnut |

-continued

| Ex. No. | Diazo component | Coupling component | Hue |
|---|---|---|---|
| 22 | 3-nitroaniline | " | red |
| 23 | 4-nitroaniline | " | chestnut |
| 24 | 2-chloro-4-nitroaniline | " | " |
| 25 | 3-nitro-4-methylaniline | " | red |
| 26 | 2-chloro-4-methoxyaniline | " | " |
| 27 | 2,5-dichloro-4-methoxyaniline | " | " |
| 28 | 4-chloro-2-trifluoromethylaniline | " | " |

-continued

| Ex. No. | Diazo component | Coupling component | Hue |
|---|---|---|---|
| 29 | 4-chloro-2-amino-1-methoxybenzene (OCH₃, NH₂, Cl) | " | " |
| 30 | methyl anthranilate (COOCH₃, NH₂) | " | " |
| 31 | ethyl anthranilate (COOC₂H₅, NH₂) | " | " |
| 32 | methyl 2-amino-5-nitrobenzoate (COOCH₃, NH₂, O₂N) | " | " |
| 33 | methyl 2-amino-5-chlorobenzoate (COOCH₃, NH₂, Cl) | " | " |
| 34 | methyl 2-amino-5-nitrobenzoate (COOCH₃, NH₂, O₂N) | " | " |
| 35 | dimethyl aminoterephthalate (COOCH₃, NH₂, CH₃OOC) | " | " |

-continued

| Ex. No. | Diazo component | Coupling component | Hue |
|---|---|---|---|
| 36 | 4-COOC₂H₅, 2-NH₂, 5-COOCH₃ (H₅C₂OOC-) benzene | " | " |
| 37 | 3,5-bis(COOCH₃), 1-NH₂ benzene | " | " |
| 38 | 2-CN aniline | " | " |
| 39 | 2-CN, 4-Cl aniline | " | " |
| 40 | 2-SO₂CH₃, 4-Cl aniline | " | " |
| 41 | 1-amino-anthraquinone | " | chestnut |

-continued
| Ex. No. | Diazo component | Coupling component | Hue |
|---|---|---|---|
| 42 |  | " | red |
| 43 |  | " | " |
| 44 |  | " | " |
| 45 |  | " | " |
| 46 |  | " | " |
| 47 |  | " | " |

-continued

| Ex. No. | Diazo component | Coupling component | Hue |
|---|---|---|---|
| 48 | *benzamide with N=O-C(=N)-phenyl and NH₂ (2-amino-N-(benzoyloxy)benzimidoyl type structure)* | *3-hydroxy-N-(2-(...)-5-chlorophenyl)-2-naphthimidamide type structure with OH, N, HN, C=O, Cl* | " |
| 49 | 2-chloroaniline | " | " |
| 50 | 2,5-dichloroaniline | " | " |
| 51 | 2,4-dichloroaniline | " | " |
| 52 | 2,4,5-trichloroaniline | " | " |
| 53 | 4-chloro-2-methylaniline | " | " |

-continued

| Ex. No. | Diazo component | Coupling component | Hue |
|---|---|---|---|
| 54 | 2-chloro-5-trifluoromethylaniline (Cl, NH₂, CF₃ on benzene) | " | " |
| 55 | methyl anthranilate (2-NH₂-C₆H₄-COOCH₃) | " | " |
| 56 | dimethyl 2-aminoterephthalate (NH₂, COOCH₃ groups on benzene) | " | " |
| 57 | 3-amino-N-phenylphthalimide | " | " |
| 58 | 2-aryl-3,1-benzoxazin-4-one with o-NH₂ | " | " |

-continued

| Ex. No. | Diazo component | Coupling component | Hue |
|---|---|---|---|
| 59 | 2-amino-benzenesulfonamide | (structure) | " |
| 60 | 2,4,5-trichloroaniline | " | " |
| 61 | ethyl 2-aminobenzoate | " | " |
| 62 | 2-nitroaniline | " | " |
| 63 | 2,4-dichloroaniline | (structure with NO₂) | chestnut |

-continued
| Ex. No. | Diazo component | Coupling component | Hue |
|---|---|---|---|
| 64 |  | " | red |
| 65 |  | " | chestnut |
| 66 |  | " | " |
| 67 |  |  | red |
| 68 |  | " | " |
| 69 |  | " | " |

-continued

| Ex. No. | Diazo component | Coupling component | Hue |
|---|---|---|---|
| 70 | 2,4,5-trichloroaniline | " | " |
| 71 | ethyl 2-aminobenzoate | " | " |
| 72 | 5-aminobenzene-1,3-disulfonamide | " | " |
| 73 | 2-amino-1,4-bis(phenoxycarbonyl)benzene | " | " |
| 74 | 2-acetamido-4-chloro-5-amino-toluene | " | " |
| 75 | 4-acetamidoaniline | " | " |

-continued

| Ex. No. | Diazo component | Coupling component | Hue |
|---|---|---|---|
| 76 | 4-amino-3-methoxyphenyl 4-(isopropoxycarbonyl)benzoate | " | " |
| 77 | 1-aminoanthraquinone | " | chestnut |
| 78 | 2,4,5-trichloroaniline | 3-hydroxy-2-naphthoyl-[(2-carbonyl-5-nitrophenyl)imino] derivative | red |
| 79 | methyl 2-aminobenzoate | " | " |
| 80 | N-(4-chlorophenyl)-3-amino phthalimide | " | " |

| Ex. No. | Diazo component | Coupling component | Hue |
|---|---|---|---|
| 81 | 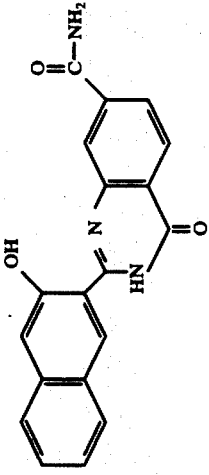 | 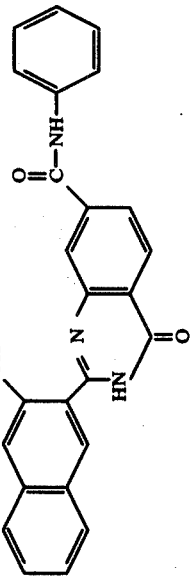 | " |
| 82 | 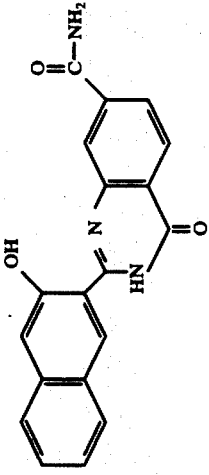 | | " |
| 83 | 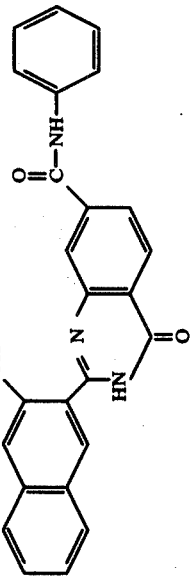 | 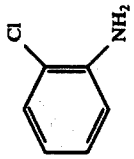 | " |
| 84 | 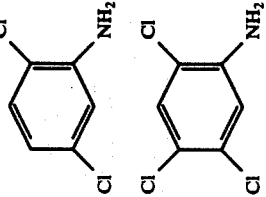 | | " |
| 85 | 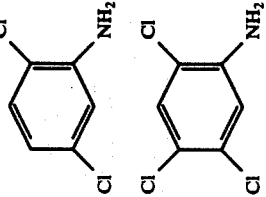 | | " |
| 86 | 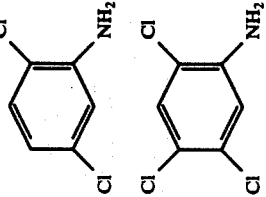 | | " |

| Ex. No. | Diazo component | Coupling component | Hue |
|---|---|---|---|
| 87 | 2-nitroaniline | naphthol-based coupler with 5-(benzoylamino)-2-iminophenyl carboxamide | " |
| 88 | 2,5-dichloroaniline | " | " |
| 89 | 2-cyanoaniline | " | " |
| 90 | 2,4,5-trichloroaniline | naphthol-based coupler with 5-(1,3-dioxoisoquinolin-2-yl)-2-iminophenyl carboxamide | " |
| 91 | 2,5-dichloroaniline | " | " |

-continued

| Ex. No. | Diazo component | Coupling component | Hue |
|---|---|---|---|
| 92 | 2-chloroaniline | naphthol-imine-amide with tetrachlorophthalimide group | " |
| 93 | 3-amino-2-benzamido-benzoyl phenyl | (same type, anthraquinone-naphthol coupler) | " |
| 94 | methyl 2-amino-4-(methoxycarbonyl)benzoate | naphthol-imine-amide with anthraquinone | " |
| 95 | 2,5-dichloroaniline | naphthol-imine-amide with naphthalene | " |

| Ex. No. | Diazo component | Coupling component | Hue |
|---|---|---|---|
| 96 | 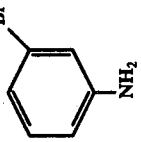 | 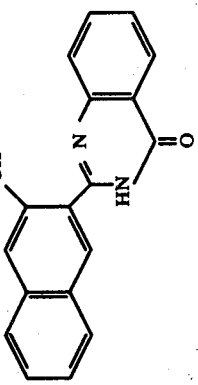 | " |

EXAMPLE 97

350 parts of the dye obtained by coupling diazotized 2,5-dichloroaniline with 2-hydroxynaphthoic acid-3 is heated to 110° within 2 hours with 1500 parts of nitrobenzene, 236 parts of thionyl chloride and 2 to 5 parts of dimethylformamide and then left at this temperature for another 2 hours. Excess thionyl chloride is removed at subatmospheric pressure and azocarboxylic chloride which separates in crystalline form from the cooled reaction mixture is suction filtered and washed with toluene and dried at 80°. 295 parts of a red crystalline powder is obtained. Analysis: calculated Cl 28.35%; found Cl 27.9%.

38 parts of this acid chloride is introduced into a solution of 13.6 parts of anthranilamide in 300 parts of N-methylpyrrolidone and heated for 1 hour at 100° and then for 2 hours at 120°. The whole is allowed to cool to 90° and a solution of 200 parts of 2N caustic soda solution is added and stirred for about 10 minutes at about 90°. A pH of 6 is then set up with 1N hydrochloric acid, and the dye is suction filtered and washed with water and then with methanol. The filter cake is then introduced into 200 parts of dimethylformamide, stirred for 1 hour at 80°, suction filtered, washed consecutively with dimethylformamide and methanol and dried. 36 parts of a brilliant red powder of the formula

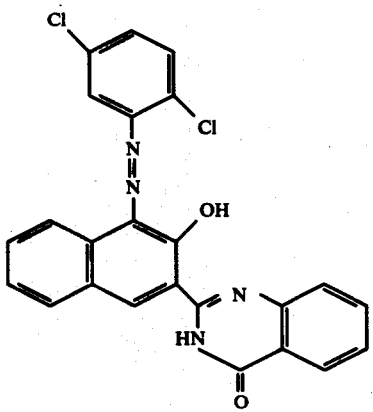

is obtained.

We claim:
1. A compound of the formula

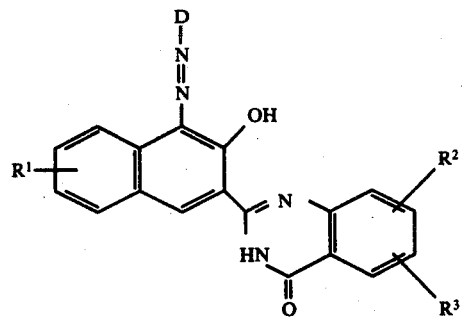

in which
D is phenyl substituted by fluoro, chloro, bromo, trifluoromethyl, nitro, cyano, $C_1$ to $C_4$ alkylsulfonyl, phenylsulfonyl, methoxy, ethoxy, methyl, ethyl, $C_1$ to $C_4$ alkoxycarbonyl, carbamoyl, N-methylcarbamoyl, N-phenylcarbamoyl, sulfamoyl or phenylazo; 3- or 4-phthalimidyl, 3- or 4-phthalimidyl substituted on the nitrogen by phenyl, chlorophenyl, methylphenyl or methoxyphenyl; 1- or 2-anthraquinonyl; 2-chloroanthraquinonyl-1; or 3-chloro- or 3-bromoanthraquinonyl-2;
$R^1$ is hydrogen, chloro, bromo, methoxy or ethoxy;
$R^2$ is hydrogen, chloro, bromo, methyl, ethyl, trifluoromethyl, nitro, methylsulfonyl, ethylsulfonyl, phenylsulfonyl, carbamoyl, N-phenylcarbamoyl, sulfamoyl, N-phenylsulfamoyl, $C_1$ to $C_4$ alkoxycarbonyl, benzoylamino or phthalimidyl;
$R^3$ is hydrogen, chloro, bromo or nitro; and
$R^2$ and $R^3$ together are

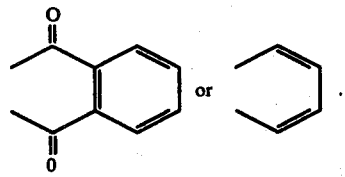

2. A compound according to claim 1 wherein $R^1$, $R^2$ and $R^3$ are hydrogen.
3. A compound according to claim 1 wherein D is phenyl substituted by chloro, bromo, methyl, methoxy, ethoxy, methylsulfonyl or $C_1$ to $C_4$ alkoxycarbonyl.
4. The compounds according to claim 1 wherein $R^1$, $R^2$ and $R^3$ are hydrogen and D is 2,4-dichlorphenyl, 2,3,5-trichlorophenyl, 2,5-dichlorophenyl, 3-bromophenyl or 2,5-dimethoxycarbonylphenyl.

* * * * *